United States Patent [19]

Sampson

[11] Patent Number: 5,525,073

[45] Date of Patent: Jun. 11, 1996

[54] ENVIRONMENTAL PROTECTION DEVICE WITH MANUALLY OPERATED LATCH MECHANISM

[75] Inventor: Jeff Sampson, Redwood City, Calif.

[73] Assignee: Raychem Corporation, Menlo Park, Calif.

[21] Appl. No.: 252,016

[22] Filed: Jun. 1, 1994

[51] Int. Cl.⁶ .................................................. H01R 13/52
[52] U.S. Cl. .......................................... 439/521; 439/358
[58] Field of Search ................................ 174/76, 138 F; 439/519, 521, 201, 202, 204, 936, 357, 358

[56] References Cited

U.S. PATENT DOCUMENTS

| | | | |
|---|---|---|---|
| 3,325,591 | 6/1967 | Wahl | 174/138 |
| 3,757,031 | 9/1973 | Izraeli | 174/138 F |
| 3,923,362 | 12/1975 | Dunn et al. | |
| 4,210,380 | 7/1980 | Brzostek | |
| 4,369,284 | 1/1983 | Chen | 524/476 |
| 4,410,226 | 10/1983 | Adauci et al. | 439/521 X |
| 4,451,696 | 5/1984 | Beinhaur | 174/92 |
| 4,595,635 | 6/1986 | Dubrow et al. | 428/447 |
| 4,600,261 | 7/1986 | Debbaut | |
| 4,610,738 | 9/1986 | Jervis | 156/49 |
| 4,634,207 | 1/1987 | Debbaut | |
| 4,643,505 | 2/1987 | House et al. | |
| 4,704,499 | 11/1987 | Faust | 174/92 |
| 4,716,183 | 12/1987 | Gamarra et al. | 522/80 |
| 4,777,063 | 10/1988 | Dubrow et al. | 427/44 |
| 4,859,809 | 8/1989 | Jervis | 174/92 |
| 4,909,756 | 3/1990 | Jervis | 439/521 |
| 4,942,270 | 7/1990 | Gamarra | 174/93 |
| 4,998,894 | 3/1991 | Gronvall | 439/521 |
| 5,079,300 | 1/1992 | Dubrow et al. | 525/106 |
| 5,080,606 | 1/1992 | Burkard | 439/403 |
| 5,107,077 | 4/1992 | Fox et al. | 439/521 X |
| 5,129,839 | 7/1992 | VanSkiver | 439/367 |
| 5,135,409 | 8/1992 | Thompson | 439/367 |
| 5,147,217 | 9/1992 | Neal, III et al. | 439/403 |
| 5,229,058 | 7/1993 | Uken et al. | 264/261 |
| 5,286,516 | 2/1994 | Uken | 427/58 |
| 5,368,501 | 11/1994 | Asbell | 439/418 |

FOREIGN PATENT DOCUMENTS

| | | |
|---|---|---|
| 0196219 | 10/1986 | European Pat. Off. |
| 0244657 | 11/1987 | European Pat. Off. ........ 439/936 |
| 0328386 | 8/1989 | European Pat. Off. |
| 0589410A3 | 5/1994 | European Pat. Off. |
| 2545285 | 11/1984 | France |
| 1947057 | 9/1968 | Germany |
| 2030073 | 9/1969 | Germany |
| 7540922 | 4/1976 | Germany |
| 3345932A1 | 12/1983 | Germany |
| 1324176 | 7/1973 | United Kingdom |
| 2273610 | 6/1994 | United Kingdom |
| 2138639 | 10/1994 | United Kingdom |
| WO89/10648 | 11/1989 | WIPO |
| WO92/22116 | 12/1992 | WIPO |

*Primary Examiner*—Khiem Nguyen
*Attorney, Agent, or Firm*—A. Stephen Zavell; Herbert G. Burkard

[57] ABSTRACT

An environmental protection device with manually operated latching mechanism is described. The device includes a rigid hook and flexible latch on opposite peripheral edges of the device with cavity halves therebetween capable of fitting together upon the latching of the hook and latch to form an enclosure around an elongate substrate such as a coaxial cable splice or a cable to tap port connection upon the closing of the device and the locking of the latch and hook members. The device is preferably filled with a gel sealing material having an elongation of at least 100% and a Voland hardness from about 1 to 50 grams.

16 Claims, 1 Drawing Sheet

ED STATES PATENT

ENVIRONMENTAL PROTECTION DEVICE WITH MANUALLY OPERATED LATCH MECHANISM

TECHNICAL FIELD OF THE INVENTION

This invention relates to environmental sealing and protection devices. More specifically, this invention relates to hinged sealant filled environmental sealing devices. In particular, this invention relates to gel filled environmental sealing closures for coaxial cables splices and/or cable connector to radio frequency source tap ports, and the like.

BACKGROUND OF THE INVENTION

When an elongate substrate such as a coaxial or telephone or electrical cable is spliced or otherwise terminated and connected to a housing or device, it is necessary to protect the cable connectors including the exposed interior conductors, the connector body and the port or splice to which the connector may be attached or the signal will be adversely affected. More specifically, when a coaxial cable is spliced both the exposed interior of the cable and the connection must be protected from moisture ingress to permit a high quality signal to be transmitted across the spice or transferred to the interior of the splitter box or amplifier or extracted from the splitter or V amplifier.

Within the past several years, gel materials such as silicone gels, polyurethane gels, polyurea gels, thermoplastic elastomer gels such as Kraton® or Septon® based polymeric materials and extender oils, and the like have been used to seal elongate substrates. Both of these thermoplastic systems are various configuration of triblock copolymers such as styrene-ethylenebutylene-styrene, styrene-ethylenepropylene-styrene, and mixed midblocked styrene-ethylene-butylene/ethylenepropylene-styrene polymers. The silicones are generally derived from either lightly cross-linked polyorganosilixane materials and/or extended polyorganosilixane materials where the extender is generally of lower molecular weight non-reactive silicone such as a silicone oil or fluid. These gels most effectively seal for reentry when the elongate substrate is sealed under compression and not potted by the gel around the substrate. More specifically, the gel is generally cured apart from at least a portion of the substrate and thereafter brought into contact with the complete substrate and in the preferred embodiments, placed under compression to seal the substrate through either a spring or a restraining the displaced movement of the gel with an enclosure. Suitable examples reciting gels and/or enclosures are illustrated in U.S. Pat. Nos. 4,610,730; 4,909,756; 4,859,809; 4,600,261; 4,634,207; 4,942,270; 4,639,284; 4,595,635; 4,777,063; 4,716,183; and 4,998,894. The complete disclosures of each of these patents are incorporated herein by reference for all purposes. Optionally, the gel may be fragmented material as taught by U.S. Pat. No. 5,229,058 and/or 5,286,516, the complete disclosures of which are also incorporated herein by reference for all purposes.

An earlier hinged gel-filled security and environmental protection device was taught in WO 92/22116 (U.S. Ser. No. 07/712,320 filed Jun. 7, 1991 and a CIP thereof Ser. No. 07/988,050 filed Dec. 7, 1992), the disclosures of these applications are completely incorporated herein by reference for all purposes. Although effective, especially for sealing coaxial cable splices, these devices had a tendency to pop open if dropped and/or oversized connectors were inserted into the device. In addition, it was often considered cumbersome to insert a screwdriver or other splitting means to open the device. Thus, it would be highly desirable to have a manually opening device as well as one which has a tendency to remain closed even if the craftsperson selects a slightly oversized connector to be sealed within the unit.

SUMMARY OF THE INVENTION

The invention provides for the previously recited desirable features as well as many other features obvious to the ordinary skilled artisan. More specifically, the device can lock around an elongate substrate such as a coaxial cable splice or over the end of a coaxial cable connector and a splitter or amplifier port to protect the coaxial cable, the connector and device to which it is attached. The device may be removed by flexing the latching mechanism. The latching mechanism of the invention provides a positive locking latch that holds the device together at higher loads than the previously described WO 92/22116 devices. However, a unique aspect of the locking latch system permits a low mate and release force in comparison to its high holding force so that it can be mated and demated with no tools. Additionally, the design of the preferred device permits two of the units to be put together in a reverse fashion to provide for sealing parallel cables, connectors and splices. In this embodiment of course the hinge between the units is not used due to the planar configuration of the two halves abutting together but a tie-wrap or other member can secure the abutting central hinges, if necessary.

BRIEF DESCRIPTION OF THE DRAWING(S)

DESCRIPTION OF THE PREFERRED EMBODIMENTS

Figure 1:
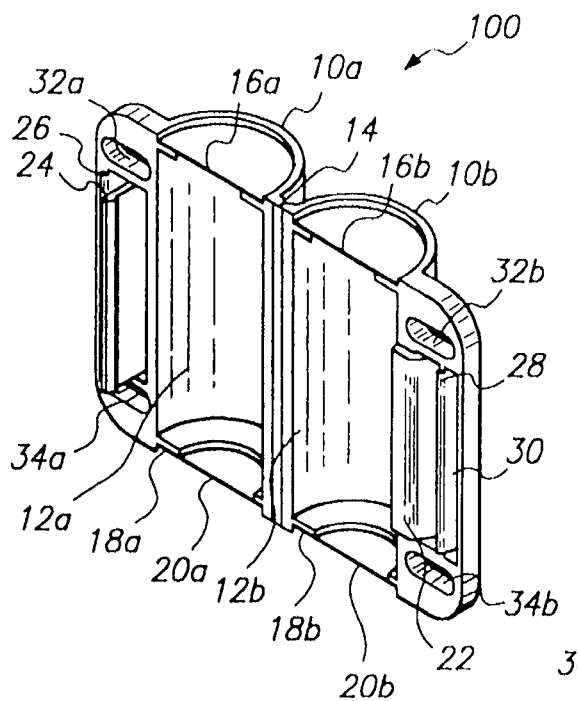
FIG. 1 illustrate an angled perspective view of an embodiment of the invention.

The invention will be described with particular reference to the appended drawings. FIGS. 1–4 should be viewed together to understand the preferred illustrated embodiment of the invention. More specifically, the preferred environmental protection device is illustrated as 100 in each of the figures. All the figures should be viewed together when referring to a particular numbered element for an overall view of the various perspectives and positioning in the preferred described embodiment.

The environmental seal and locking device 100 includes two halves 10a and 10b joined by a living hinge 14 such as a thin piece of the same plastic as halves 10a and 10b to hold the device 100 open during gel filling and curing while permitting the opposed halves 10a and 10b to fold thereabouts to lock into the enclosure about the substrate to be sealed.

Optionally, a breakable web, not illustrated, as taught in WO 92/22116 can be used to assist holding the device open during sealant filling operations.

Halves 10a and 10b include compartments 12a and 12b formed by closing the ends of the two halves with thin sections 16a and 16b and 20a and 20b. Each section has a more rigid outer shoulders 18a and 18b and rigid sections opposite thereto for thin sections 16a and 16b. These rigid sections strengthen the overall enclosure. The thin sections 16a and 16b and 20a and 20b collapse and/or stretch upon the closing of the device around a coaxial cable, cable connector or cable tap splice. Suitable materials for the device 100 are polypropylene, nylon, polyethylene and the like or any suitable impact resistant and weather resistant non-corroding material which has hinging properties to the material. Optionally, not illustrated, the hinge 14 can be a standard molded hinge of plastic metal or other suitable materials rotatable about a central pin member. Under this option, the body material 100 need not have living hinge/flexing properties.

The device 100 further includes the main cavity formed upon the closing of the device as illustrated by the preferred semi-circular partial cavities 10a and 10b. The collapsable/stretchable end seals 16a and 16b and 20a and 20b provide ends pieces which restrain the gel upon the filling of the cavity 12a and 12b. A suitable sealing material substantially fills the cavity such as a silicone gel (such as a polyorganosiloxane gel), a polyurea gel, a polyurethane gel or any suitable gel sealing material. Preferred gels have cone penetration perimeters as measured by ASTM D-217 of about 100 to 400 ($10^{-1mm}$) preferably between about 200-350 ($10^{-1mm}$) an an ultimate elongation as measured by ASTMD D-638 of greater than about 100% and preferably greater than about 200% and most preferably greater than about 400% as measured at the higher test speed.

The gels/sealants may also be characterized by a Voland/Stevens texture analyze. It is preferred that the gel have a hardness of from about 1 to about 50 grams, preferably 5 to about 30 grams and especially 18 to 28 grams having a stress relaxation of between 1 to 55%. Although not believed to be a critical aspect of this environmental closure, the gel has preferably a tack from about 5 to 40 grams and preferably 9 to 35 grams. The hardness, stress relaxation, and tack is measured using a Voland/Stevens texture analyzer model LFRA having a 1,000 gram load cell, a 5 gram trigger, and a 0.25 inch (6.35 mm) ball probe as described in U.S. Pat. No. 5,079,300 (Debrow et. al.) the disclosure of which is incorporated herein by reference. More particularly the hardness is measured using a 20 ml glass scintillating vial containing about 10 to 12 grams of gel. The vial is placed in the analyzer and the stainless steel ball probe is forced into the gel at a speed and 0.20 mm/second to penetrate a distance of 4 mms. The gram force necessary to penetrate 4 mm is the hardness. Higher numbers are harden gels.

More generally, although gel materials within the perimeters previously described are preferred, any suitable sealing material which can wrap around the cable tap port and/or the cable splice and seal out the ingress of moisture is suitable for use in the invention. Gels are preferred because as extended solid systems they do not flow the way greases do upon high temperature thermal cycling.

Particularly preferred materials are gels by Raychem Corporation under having name Gel Tek® gel, tough silicone gel number T894, preferably T854, or a silicone based gel number 612 sold by the Germany Warker or a Dow Corning gel called Sylgard®527.

Alternatively, a thermoplastic elastomer can be used such as a mixture of a Kraton® or Septon® polymer with sufficient plasticizer oil to form a Kraton® or a Septon® based thermoplastic gel. The Kraton® or Septon® gels are polymers of the styrene-ethylene butylene and/or ethylene-propylyene-styrene configuration. The gels are from about 3-5% maybe up to 20% polymer and from 80-97% plasticizer oil. The 3-5% polymer percentages extended 95-97% by a napthenic oil are preferred. In the event that the sealing material is a thermoplastic elastomer gel then the collapsable end pieces 16a and 16b and 20a and 20b are optional because the thermoplastic nature of the gel permits the enclosure be filled with the end portions blocked in a mold and upon cooling the gel remains in place.

Figure 2:
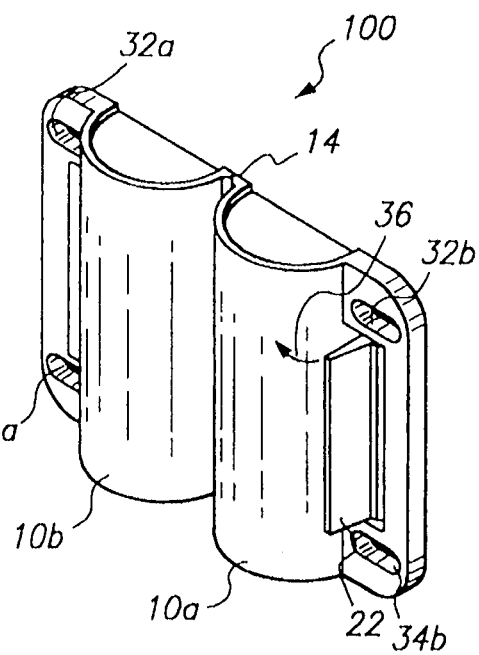
FIG. 2 illustrates an angled perspective view of the opposite side of the embodiment of FIG. 1.
Figure 3:
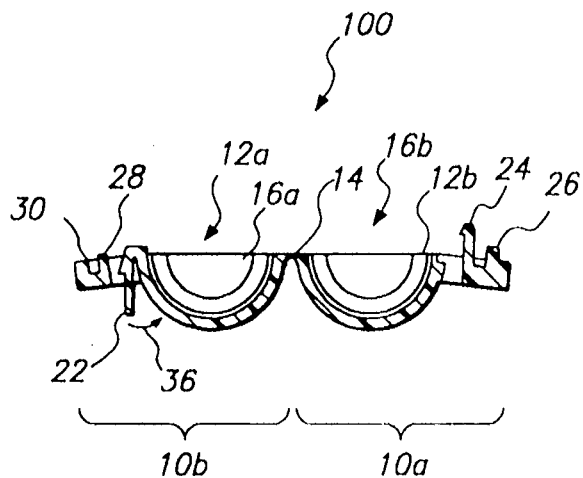
FIG. 3 illustrates a cross-sectional view of the embodiment of the invention in FIGS. 1 and 2 in the open position.
Figure 4:
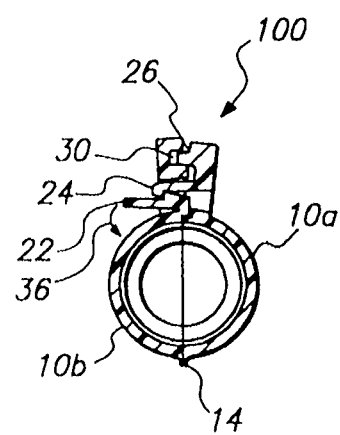
FIG. 4 illustrates a cross-sectional view of the embodiment of the invention illustrated in FIGS. 1, 2, and 3 in the closed position.

The enclosure 100 includes a latch 22 and a rigid hook 24 with interdigitated raised portion 26 closer to an edge than the hook 24 and a channel 30 on the latch side to receive the ridge 26. The latch side also has a ridge 28 which is received in a channel in the hook side, These ridge and channels restrain movement of the hook and latch in the vertical direction of FIG. 4. The use of a rigid hook 24 and flexible latch 22 which is the opposite of the common mechanical configurations, provides a positive locking latch that holds together at higher loads before releasing. However, the latch has a low mate and release force in comparison to its high holding force so that it can be demated with no tools, i.e. demated by hand. More specially, the latch is sized for an enclosing and RG 59/RG6 connector and will hold loads of up to 20 lbs force while releasing at a force less than 10 lbs. The movement of the latch 22, illustrated by the arrow 36 in FIGS. 2, 3, and 4, provides the hook releasing mechanism. The selection of a plastic with a living hinge property permits the flexing of the latch along its hinge line in a likewise manner to hinge 14. The ridges and channels 26, 28, and 30 interlock to add additional strength and rigidity to the device upon closure as illustrated in FIG. 4.

Optionally, the device includes apertures 32a and 32b and 34a and 34b which upon closing of the device permit the additional adding of tie wraps or like items for an even more positive and firm closing.

A further unique feature of the device is that because of its uniform overall nature two separate halves can be reversed and snapped together to create an enclosure having two cavities if parallel lines of coaxial cables need to be sealed.

The present enclosure provides an even more positive locking mechanism and higher locking forces than described in WO 92/22116 the specification of which is completely incorporated herein by reference for all purposes as well as U.S. application Ser. Nos. 07/712,320 and 07/988,050 likewise incorporated herein by reference for all purposes.

The interior of the semi-circular cavities 16a and 16b may optionally included ribs or be glow discharge treated during manufacture to enhance the affinity of the sealing material to adhere thereto. The roughened surface treatment, EDM texture within the parts optionally also allows for increased surface area and the microscopic undercuts which further improve the gel adhesion to the shell. Although the device has been described with respect to particularly preferred embodiment and sized to use with an RG59/RG6 cables splices and tap ports, it can be sized to accommodate any cable connection. Modifications which would be obvious to one of ordinary skill in the art are contemplated to be within the scope of the invention.

What is claimed is:

1. An environmental protection device for an elongate substrate passing therethrough and/or there into, said device comprising:

a hinged body which includes a longitudinal flexible latch member adjacent an aperture formed in said body and extending along a peripheral edge and a rigid hook member on an opposite peripheral edge of the device, first and second cavity halves therebetween capable forming a cavity to enclose around an elongate substrate upon the closing of the device and the latching of the rigid hook and flexible latch member through said aperture, at least one edge including an elongate ridge capable of being received in a trough on an opposite peripheral edge, said ridge and trough assisting in the closing of the cavity halves wherein the latch and hook have a mating force and release force which are less than the holding force of the latch and hook when mated.

2. The device according to claim 1 wherein the latch and hook receptacle members hinge about a living hinge between cavity halves.

3. The device according to claim 2 wherein the cavity halves are filled with a sealant material selected from the group consisting of a polyurethane gel, a silicone gel, a thermoplastic elastomer with plasticizing oil gel, or a polyurea gel.

4. The device according to claim 3 wherein the body is fabricated from a material selected from the group consisting of polypropylene, nylon, and polyetheylene.

5. The device according to claim 4 wherein the gel has a Voland hardness of from about 10 to about 50 grams and an ultimate elongation of at least about 100%.

6. The device according to claim 5 further including passages through opposite peripheral edges of the device to provide means for securing members to pass therethrough upon the closing of the device.

7. The device according to claim 6 wherein the interior of the cavity halves includes a surface treatment to enhance the adhesion of the gel thereto.

8. The device according to claim 7 wherein the surface treatment is selected from the group consisting of chemical etching, glow discharge etching, and a plurality of ribs molded therein.

9. The environmental protection device according to claim 5 further including a second hingeable body having first and second cavity halves and a hook and latch mechanism on peripheral edges wherein the hook of the second body mates to the latch of the first body and the latch of the first body mates with the hook of the second body to seals parallel coaxial cable splices passing containing coaxial cable passing therethrough within the mated cavity halves.

10. The device according to claim 5 further including two coaxial cable connectors spliced together across a coaxial cable splice and sealed within the cavity of the cavity halves.

11. The device according to claim 4 wherein the latch flexes about a living hinge.

12. In an environmental protection device for coaxial cable, coaxial cable connectors, splices and/or tap or splitter signal ports, the improvement which comprises:

a rigid hook and a flexible latch along opposite edges of the coaxial cable, coaxial cable connector, tap port or signal port protection device, said hook and latch exhibit a holding together force upon connecting together which is greater than the force required to unlatch the hook and latch, said latch adjacent an aperture formed in said device and flexes towards a body of the device for unlatching from the hook which extend through said aperture.

13. The device according to claim 11 wherein the gel has a Voland hardness of from about 10 to about 50 grams and an ultimate elongation of at least about 100%.

14. The device according to claim 13 wherein the latch flexes about a living hinge.

15. The device according to claim 14 wherein the cavity halves are filled with a sealant material selected from the group consisting of a polyurethane gel, a silicone gel, a thermoplastic elastomer with plasticizing oil gel, or a polyurea gel.

16. The device according to claim 1 wherein the periphery of the trough adjacent the rigid hook restricts the outward movement of the rigid hook member so as to retain the device closed in the absence of the flexing of the latch member towards the body.

* * * * *